(12) United States Patent
Doddaiah et al.

(10) Patent No.: US 12,164,418 B2
(45) Date of Patent: Dec. 10, 2024

(54) MACHINE LEARNING-BASED, SYSTEM-WIDE SOLID-STATE DRIVE WEAR-LEVEL BALANCING ALGORITHM TO EXTEND THE SERVICE LIFE OF SOLID-STATE DRIVES

(71) Applicant: Dell Products L.P., Hopkinton, MA (US)

(72) Inventors: Ramesh Doddaiah, Westborough, MA (US); Malak Alshawabkeh, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 95 days.

(21) Appl. No.: 18/145,877

(22) Filed: Dec. 23, 2022

(65) Prior Publication Data

US 2024/0211390 A1    Jun. 27, 2024

(51) Int. Cl.
*G06F 12/02*     (2006.01)
*G06F 11/30*     (2006.01)

(52) U.S. Cl.
CPC ...... *G06F 12/0238* (2013.01); *G06F 11/3037* (2013.01); *G06F 2212/7211* (2013.01)

(58) Field of Classification Search
CPC ............. G06F 12/0238; G06F 11/3037; G06F 2212/7211; G06F 3/0688; G06F 3/0604; G06F 3/0619; G06F 3/0616; G06F 3/0649
See application file for complete search history.

(56) References Cited

U.S. PATENT DOCUMENTS

| | | | |
|---|---|---|---|
| 10,140,034 B2 * | 11/2018 | Fang | G06F 3/0616 |
| 10,228,858 B1 * | 3/2019 | Stoakes | G06F 3/0641 |
| 2012/0317337 A1 * | 12/2012 | Johar | G11C 16/349 |
| | | | 711/E12.008 |
| 2022/0007198 A1 * | 1/2022 | Mahalingam | H04W 16/20 |
| 2022/0066882 A1 * | 3/2022 | Wang | G06F 12/0253 |

FOREIGN PATENT DOCUMENTS

| | | | |
|---|---|---|---|
| CN | 112650446 A | * | 4/2021 |
| JP | 2018180845 A | * | 11/2018 |

* cited by examiner

*Primary Examiner* — Curtis James Kortman
(74) *Attorney, Agent, or Firm* — Anderson Gorecki LLP

(57) ABSTRACT

SSD service life is extended by monitoring wear-level and prompting relocation of unstable data out of SSDs that have reached a soft wear-level threshold such that those SSDs do not contain unstable data when those SSDs reach a hard wear-level threshold. The progression of SSD wear-level is forecasted using an ARIMA algorithm. Unstable data on SSDs between predicted times of reaching the soft and hard thresholds is replaced by stable data from SSDs that have not reached the soft wear-level threshold. The stable data may be snapshot data and deduplicated data and deduplication hashes characterized based on number of references. SSDs that reach the hard threshold without unstable data can remain in service for read IOs until being replaced.

20 Claims, 4 Drawing Sheets

MACHINE LEARNING-BASED, SYSTEM-WIDE SOLID-STATE DRIVE WEAR-LEVEL BALANCING ALGORITHM TO EXTEND THE SERVICE LIFE OF SOLID-STATE DRIVES

TECHNICAL FIELD

The subject matter of this disclosure is generally related to electronic data storage systems.

BACKGROUND

Institutional data storage systems such as storage area networks (SANs), network-attached storage (NAS), and software-defined and disaggregated variants thereof are often configured to maintain storage objects for use by instances of host applications for email, accounting, inventory control, manufacturing, and a wide variety of other organizational functions. Such data storage systems store data on arrays of disk drives such as solid-state drives (SSDs) based on electrically erasable programmable read-only memory (EEPROM) technology such as NAND and NOR flash memory. SSDs have a finite service life that is a function of program/erase (P/E) cycles required to service input-output operations (IOs) that cause data to be stored on the drive. In order to store data, SSDs write the data to blocks of a page of memory by programming the memory cells associated with those blocks. In order to overwrite or change existing data, SSDs write the new data to blocks of a new page and mark the old data blocks on the old page as stale. Eventually, the old page is erased in its entirety and recycled by clearing the memory cells. SSD memory cells are expected to fail after a certain number of P/E cycles. SSD expected service life from new may be expressed as an endurance rating in units of drive writes per day (DWPD) that can be sustained for a certain time period such as 5 years. At least some SSDs are configured to provide an indication of their remaining wear-level, e.g., in terms of the already-utilized or remaining percentage relative to the endurance rating.

SUMMARY

All examples, aspects, and features mentioned in this document can be combined in any technically possible way.

In accordance with implementations, an apparatus comprises: a plurality of solid-state drives (SSDs); at least one compute node that manages access to the SSDs; and a wear-load controller configured to: prompt relocation of unstable data out of ones of the SSDs that have reached a soft wear-level threshold such that those SSDs do not contain unstable data when those SSDs reach a hard wear-level threshold.

In accordance with some implementations, a method comprises: monitoring wear-level of individual solid-state drives (SSDs) of a plurality of SSDs of an array; and prompting relocation of unstable data out of ones of the SSDs that have reached a soft wear-level threshold such that those SSDs do not contain unstable data when those SSDs reach a hard wear-level threshold.

In accordance with some implementations, a non-transitory computer-readable storage medium stores instructions that when executed by a computer cause the computer to perform a method comprising: monitoring wear-level of individual solid-state drives (SSDs) of a plurality of SSDs of an array; and prompting relocation of unstable data out of ones of the SSDs that have reached a soft wear-level threshold such that those SSDs do not contain unstable data when those SSDs reach a hard wear-level threshold.

DETAILED DESCRIPTION

Some aspects, features, and implementations described herein may include machines such as computers, electronic components, optical components, and processes such as computer-implemented steps. It will be apparent to those of ordinary skill in the art that the computer-implemented steps are stored as computer-executable instructions on a non-transitory computer-readable medium. Furthermore, it will be understood by those of ordinary skill in the art that the computer-executable instructions may be executed on a variety of tangible processor devices. For ease of exposition, not every step, device, or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of tangible features. The term "physical" is used to refer to tangible features. For example, multiple virtual computing devices could operate simultaneously on one physical computing device. The term "logic" is used to refer to special purpose physical circuit elements, software instructions stored on a non-transitory computer-readable medium and implemented by multi-purpose tangible processors, or a combination of both. The terms "disk" and "drive" are used interchangeably and are not intended to be limited to a particular type of non-volatile data storage media.

Figure 1:
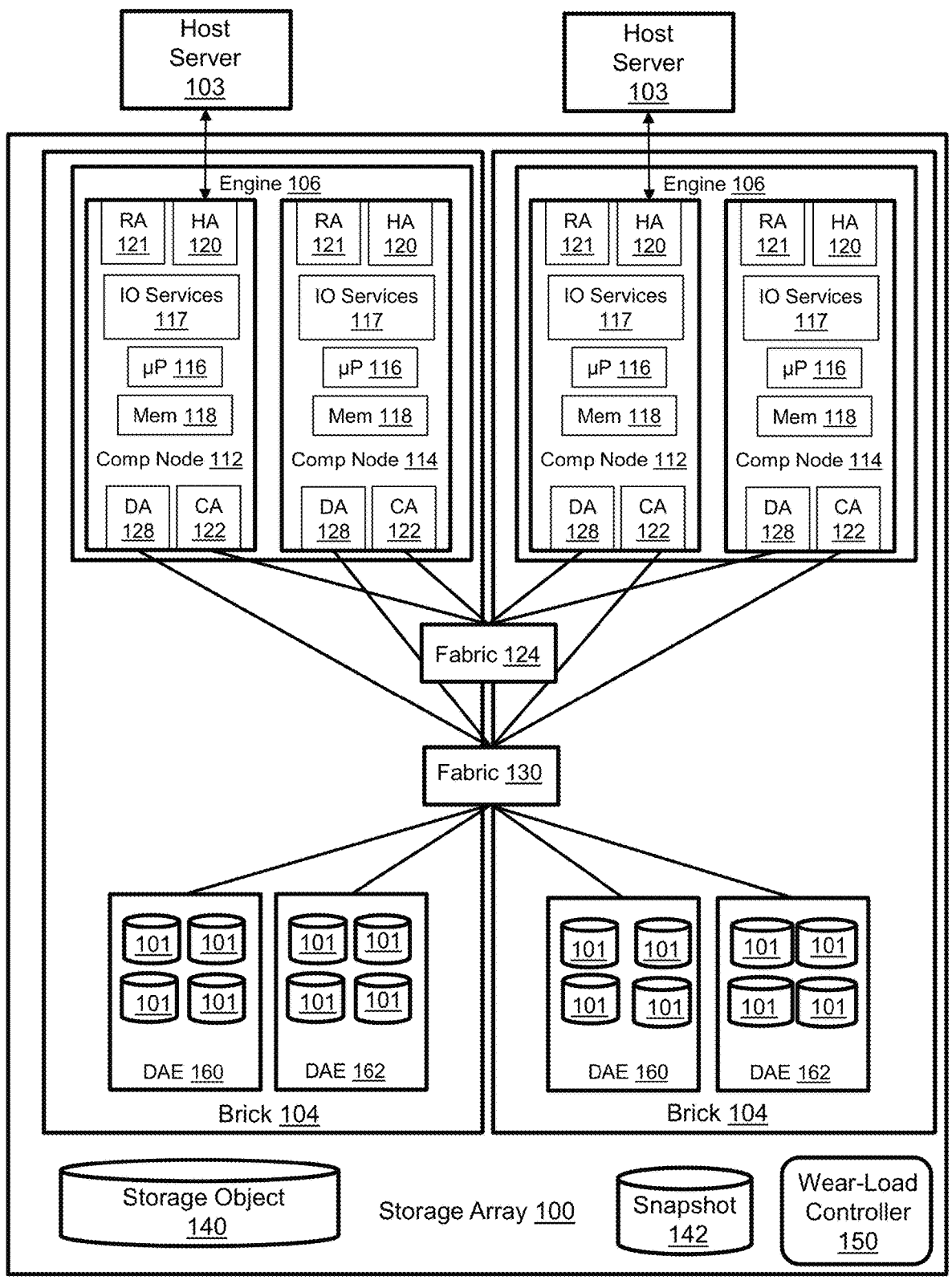
FIG. 1 illustrates a storage array with a wear-load controller that uses machine learning to implement a system-wide SSD wear-balancing algorithm to extend the service life of SSDs.

FIG. 1 illustrates a storage array 100 with a wear-load controller 150 that uses machine learning to implement a system-wide SSD wear-balancing algorithm to extend the service life of SSDs. The storage array 100 supports host servers 103 that run host applications. The host servers 103 include volatile memory, non-volatile storage, and one or more tangible processors. The storage array 100 includes one or more bricks 104. Each brick includes an engine 106 and one or more drive array enclosures (DAEs) 160, 162. Each engine 106 includes a pair of interconnected single-board compute nodes 112, 114 that are arranged in a failover relationship and may be referred to as "storage directors." Each compute node includes electronic hardware resources such as multi-core processors 116 and local memory 118. The processors may include multiple dies in multiple sockets with central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by other compute nodes of the storage array via direct memory access (DMA). Managed drives 101 in the DAEs 160, 162 are SSDs based on EEPROM technology such as NAND and NOR flash memory. Drive controllers may be associated with the managed drives as is known in the art. An interconnecting fabric 130 enables implementation of an N-way active-active backend. Every drive adapter 128 in the storage array can reach every DAE via the fabric 130.

Each compute node 112, 114 includes emulation modules that may run on virtual machines or guest operating systems under a hypervisor or in containers. Front-end emulation modules include a host adapter (HA) 120 and a remote adapter (RA) 121. The host adapter handles communications with the host servers 103. The remote adapter (RA) 121 handles communications with other storage systems, e.g., for remote mirroring, backup, and replication. Back-end emulation modules include a channel adapter (CA) 122 and a drive adapter (DA) 128. The channel adapter 122 handles communications with other compute nodes via an interconnecting fabric 124. The drive adapter 128 handles communications with managed drives 101 in the DAEs 160, 162. An IO services adapter 117 performs a variety of functions in support of servicing IOs from the host servers and performs storage array management tasks. The emulation modules running on the compute nodes have exclusive allocations of the local processor cores and local memory resources so different emulation modules are not free to access all local processor cores and memory resources without constraints. More specifically, each emulation module runs its own processes and threads on its own processor cores using its own memory space.

Data associated with instances of the hosted applications running on the host servers 103 is maintained on the managed drives 101. The managed drives are not discoverable by the host servers, but the storage array creates a logical storage object 140 that can be discovered and accessed by the host servers. Without limitation, the storage object may be referred to as a source device, production device, production volume, or production LUN, where the logical unit number (LUN) is a number used to identify logical storage volumes in accordance with the small computer system interface (SCSI) protocol. From the perspective of the host servers 103, the storage object 140 is a single disk drive having a set of contiguous fixed-size logical block addresses (LBAs) on which data used by the instances of the host application resides. However, the host application data is stored at non-contiguous addresses on various managed drives 101. The IO services emulations maintain metadata that maps between the logical block addresses of the storage object 140 and physical addresses on the managed drives 101 in order to process IOs from the hosts. Snapshots of production storage objects such as snapshot 142 of storage object 140 are generated and stored on the managed drives. Moreover, the data stored on the managed drives may be deduplicated. For example, blocks of data may be hashed, and the resulting hashes used to identify duplicate blocks that are replaced by pointers to a single instance of the block.

Figure 2:
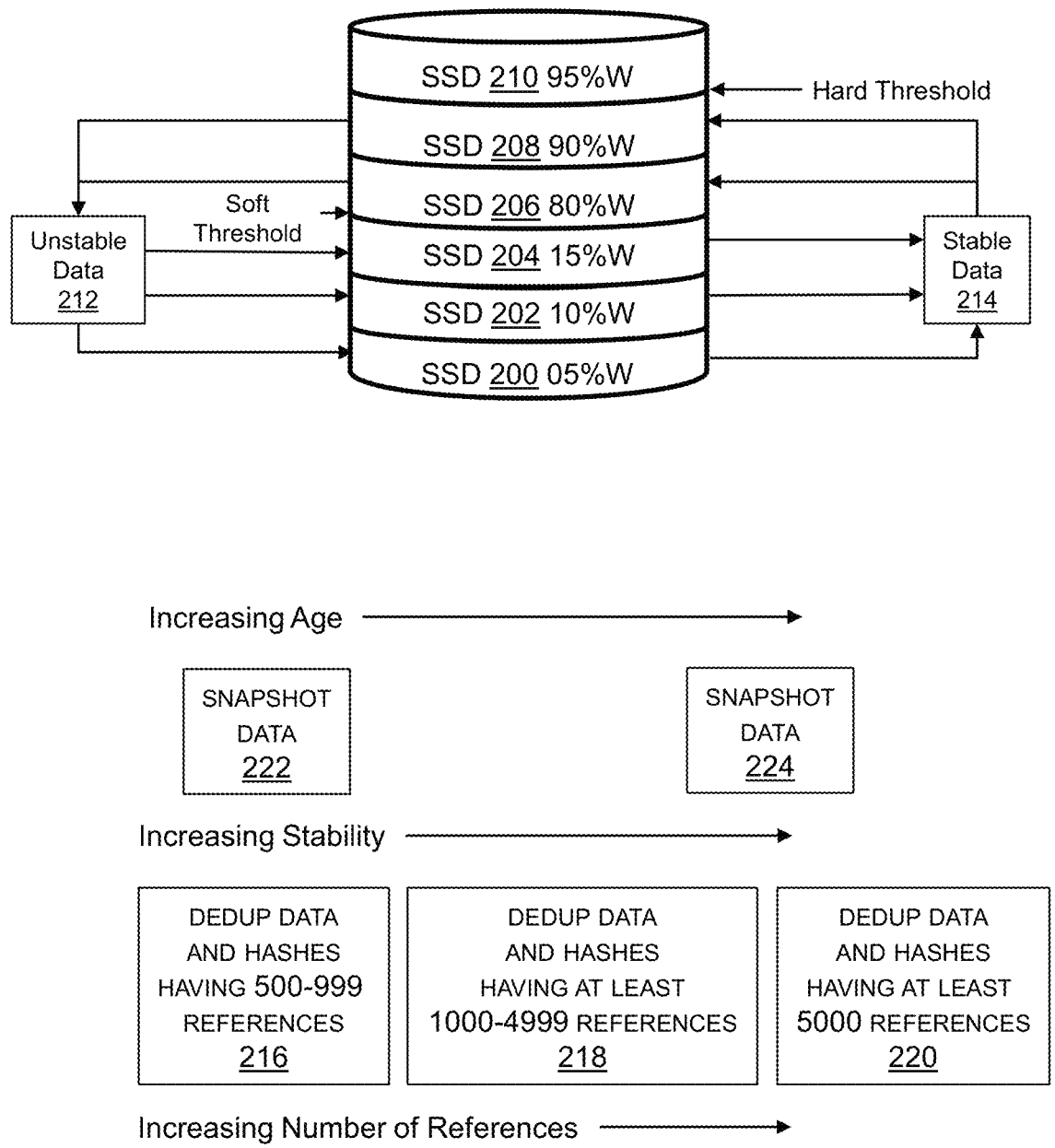
FIG. 2 illustrates replacement of unstable data with stable data on SSDs that have exceeded a soft wear-level threshold but not yet reached a hard wear-level threshold.

Referring to FIGS. 1 and 2, the wear-load controller 150, which may run on the IO services modules 117, periodically queries the managed drives 101 to learn the remaining wear-level of each managed drive. The managed drives may report their remaining wear-level in terms of the already-utilized or remaining percentage of total lifetime endurance in terms of P/E cycles. For example, a nearly unused SSD 200 might report 5% already-utilized (95% remaining) wear-level at the rated DWPD and an SSD 210 reporting 95% already-utilized (5% remaining) wear-level at the DWPD would be approaching the end of its service life. The wear-load controller 150 uses the reported wear-level percentages to determine SSD wear-level state relative to a soft threshold and a hard threshold. An SSD at or above a hard threshold such as 95% already-utilized wear-level is prevented from being the target of write IOs. However, such SSDs can continue to service read IOs. An SSD at or above a soft threshold such as 80% already-utilized wear-level, but below the hard threshold, is prepared for reaching the hard threshold at which it will no longer be the target of write IOs.

Preparation for reaching the hard wear-level threshold includes relocation of unstable data 212 out of the SSD and location of stable data 214 on the SSD. Unstable data is more likely to be changed than stable data, which is unlikely to be changed, so data relocations help to promote data storage conditions in which the SSD will not be the target of write IOs. The wear-load controller 150 characterizes data in terms of stability based on data type and characteristics. For example, the stability of deduplicated data and hashes of deduplicated data may be determined from a characteristic such as the number of references (e.g., pointers) to a single instance of the deduplicated data or hash, with relative stability being proportional to the number of references. Deduplicated data and hashes of deduplicated data may be grouped based on the number of references, e.g., in order of increasing stability: group 216 with 500-999 references, group 218 with 1000-4999 references, and group 220 with at least 5000 references. Stability of a type of data such as snapshot data may be determined from age, with an older snapshot 224 being more stable than a more recent snapshot 222. Snapshots may be generated frequently but, to avoid exhausting available storage space, only a fraction of the snapshots are maintained for a long time or indefinitely. Alternatively, snapshot data as a type may be considered stable because it is unlikely to be changed.

Eviction of unstable data 212 and population with stable data 214 is implemented at a controlled rate. The controlled rate may be calculated such that the SSD will not contain any unstable data and will be fully utilized for storage of stable data when the hard threshold is predicted to be reached. In the illustrated example, SSDs 206, 208 have exceeded the soft threshold of 80% already-utilized wear-level so unstable data 212 is being relocated from those SSDs to SSDs 200, 202, 204 that have not exceeded the soft threshold. Further, SSDs 206, 208 are being populated with stable data 214 from the SSDs 200, 202, 204 that have not exceeded the soft threshold. In general, the most unstable data may be prioritized for eviction and the most stable data may be prioritized for selection to populate the SSDs being prepared for the hard threshold. SSD 210 which has reached the hard threshold of 95% already-utilized wear-level contains only stable data and is no longer the target of write IOs.

Figure 3:
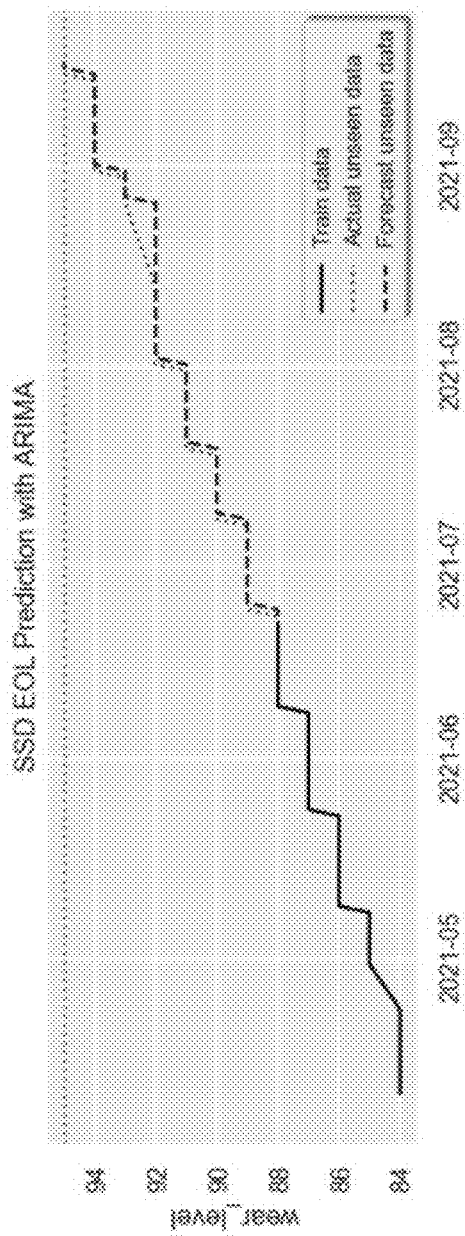
FIG. 3 illustrates prediction of SSD wear-level progression using ARIMA.

Referring to FIG. 3, the wear-load controller calculates the rate of eviction of unstable data and population with stable data using predictive analytics to forecast the points in time when the SSD will reach certain wear-level values WLt. SSD wear-level data is collected at regular intervals, e.g., daily, and in a chronological order, i.e., in time series. SSD wear-level progression is modeled using univariate time series forecasting with Auto Regressive Integrated Moving Average (ARIMA). ARIMA is a forecasting algorithm based on the idea that the information in past values of the time series—its own lags and the lagged forecast errors—can alone be used to predict the future values as shown in the equation below. An ARIMA(p,d,q) model is characterized by three terms: p, d, q where, p is the order of the AR term, q is the order of the MA term, and d is the number of differencing required to make the time series stationary.

$$[WL]\_t = \alpha + \beta\_1 \, [WL]\_(t-1) + \beta\_2 \, [WL]\_(t-2) + \ldots + \beta\_p \, [WL]\_(t-p) \, [ + \epsilon]\_(t) + \varphi\_1 \, \epsilon\_(t-1) + \varphi\_2 \epsilon\_(t-2) + \ldots + \varphi\_q \, \epsilon\_(t-q)$$

In other words, the predicted $[WL]\_t$=Constant+Linear combination Lags of WL (upto p lags)+Linear Combination of Lagged forecast errors (upto q lags).

The rate of eviction of unstable data and population with stable data between the soft threshold and the hard threshold may be linear or non-linear, e.g., becoming exponentially more aggressive as the hard threshold becomes closer in time.

A score S is assigned to each SSD at the predicted time of reaching the soft threshold. The score is updated based on changes in wear-level and the amount of load that the SSD can service without significantly altering its wear-level progression relative to the ARIMA forecast. The score may be calculated as:

$$S_t = \beta_0 + \beta_1 * WL_t$$

SSDs characterized by similar wear-level may be organized into a media pool with a DWPD credit value C for tracking purposes. A pool m has a credit value Cm which is updated every t seconds. At any point in time, the credit value for a given media pool represents the wear out rate of the media pool in relation to its DWPD. For media pool m with DWPD ω:

if $Cm < 0 \rightarrow$ Avg. DWPD Consumed $> \omega$;

if $Cm = 0 \rightarrow$ Avg. DWPD Consumed $= \omega$; and if $Cm > 0 \rightarrow$ Avg. DWPD Consumed $< \omega$.

Tracking SSD wear-level progression at the media pool level may require fewer resources than tracking wear-level progression on an individual drive basis.

Figure 4:
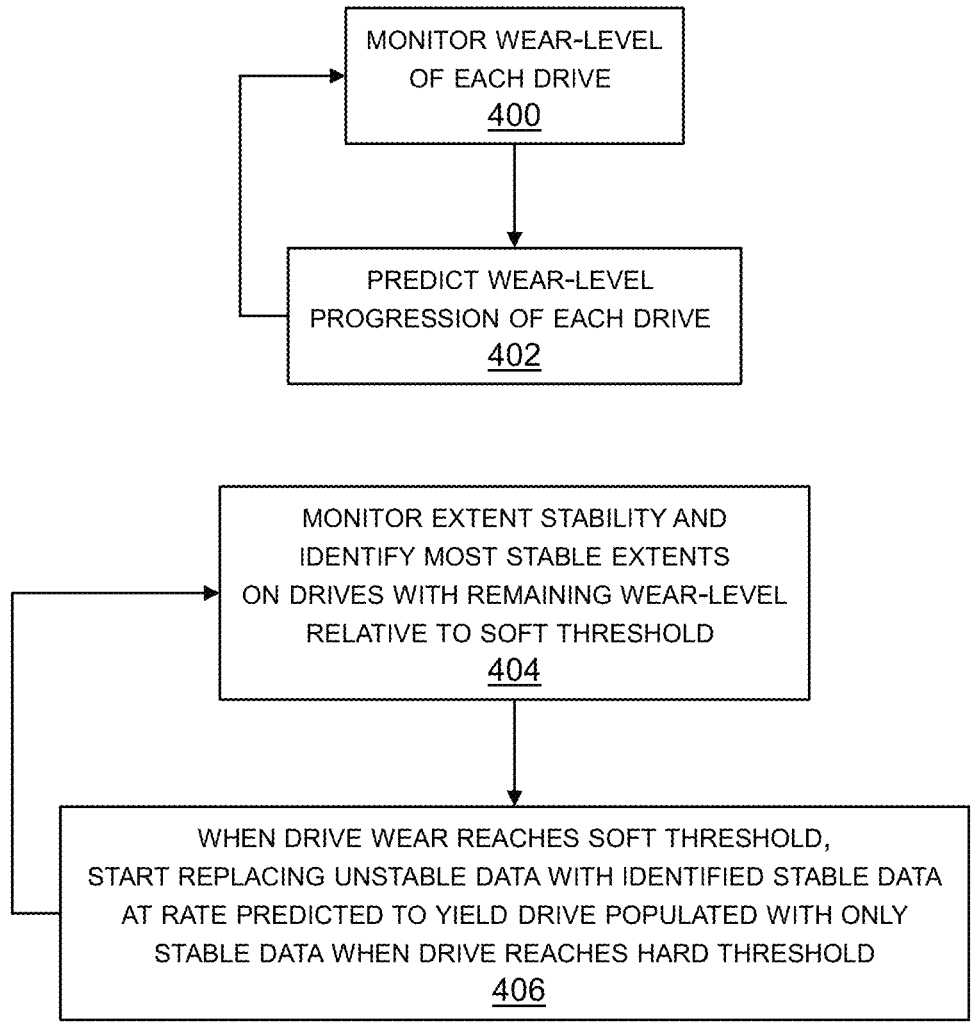
FIG. 4 illustrates a method performed by the wear-load controller.

FIG. 4 illustrates a method performed by the wear-load controller. The remaining wear-level of each drive is monitored in step 400. This may include querying SSDs and storing the results. Step 402 is predicting the wear-level progression of each drive. This may include using ARIMA analysis with the monitored wear-level information. Steps 400 and 402 may be performed iteratively such that the predicted wear-level progression is updated based on the monitored remaining wear-level. SSDs may be tracked individually and/or grouped into media pools and tracked collectively. Step 404 is monitoring extent stability and identifying the most stable extents stored on drives characterized by remaining wear-level below the soft threshold. This may include using data type such as snapshot data and data characteristics such as the number of references to deduplicated data and deduplication hashes as stability indicators. Step 406 is replacing unstable data with stable data on drives that have reached the soft threshold but have not yet reached the hard threshold. The replacement rate may be calculated to achieve a condition in which only stable data is stored on the SSD when it is predicted to reach the hard threshold. The rate may be set and updated based on predicted wear-level progression, as updated. Steps 404 and 406 are performed iteratively, in parallel with steps 400, 402.

The service life of SSDs is extended by replacing unstable data with stable data as the SSD approaches the end of its service life as indicated by remaining wear-level. Ordinarily, an SSD at 95% already-utilized wear-level would be considered to be close to failure in terms of time. Having individual SSDs fail randomly can be problematic because performance of service visits to replace individual drives is inefficient. Extending the wear-level of drives at the hard threshold allows accumulation of pools of drives that remain in service for read IOs pending drive replacement, which improves the efficiency of service visits because drives are replaced in groups.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
    a storage array comprising:
        a plurality of solid-state drives (SSDs);
        at least one brick comprising two storage directors that are configured in a failover relationship and service host application IO commands to access host application data stored on the SSDs, each of the storage directors having a processor and a memory; and
        a wear-load controller running on emulations on the processors of the storage directors, the wear-load controller configured to:
            characterize extents of data stored on each SSD of the plurality of SSDs in terms of stability from most stable to least stable based on data type and number of references to single instances of deduplicated data and hashes; and
            relocate the least stable extents of data out of, and relocate the most stable extents of data into, a first SSD, among the plurality of SSDs, that has reached a first wear-level threshold at a relocation rate calculated such that the first SSD is no longer a target of write IOs when the first SSD reaches a second wear-level threshold.

2. The apparatus of claim 1 further comprising the wear-load controller being configured to monitor wear-levels of the plurality of SSDs for data relocation.

3. The apparatus of claim 2 further comprising the wear-load controller being configured to calculate the relocation rate by forecasting wear-level progression of the SSDs based on the monitored wear-levels of the plurality of SSDs using an Auto Regressive Integrated Moving Average (ARIMA) forecasting algorithm and relocate the most stable extents of data into, and least stable extents of data out of, the first SSD at the calculated relocation rate.

4. The apparatus of claim 3 further comprising the wear-load controller being configured to identify and select, for relocation into the first SSD, the most stable extents of data on second SSDs, among the plurality of SSDs, that have not reached the first wear-level threshold.

5. The apparatus of claim 4 further comprising the wear-load controller being configured to identify and select the most stable extents of data on the second SSDs based on a number of references to deduplicated extents.

6. The apparatus of claim 5 further comprising the wear-load controller being configured to identify and select the most stable extents of data on the second SSDs based on a number of references to deduplication hashes.

7. The apparatus of claim 6 further comprising the wear-load controller being configured to identify and select the most stable extents of data on the second SSDs based on association with a snapshot.

8. The apparatus of claim 7 further comprising the wear-load controller being configured to replace least stable extents of data in SSDs, among the plurality of SSDs, that have reached the first wear-level threshold and have not reached the second wear-level threshold with the most stable extents of data from SSDs, among the SSDs, that have not reached the first wear-level threshold.

9. A method comprising:
monitoring wear-level of individual solid-state drives (SSDs) of a plurality of SSDs of an array configured to service host application IO commands to access host application data stored on the SSDs;
characterizing extents of data stored on each SSD of the plurality of SSDs in terms of stability from most stable to least stable based on data type and number of references to single instances of deduplicated data and hashes; and
relocating the least stable extents of data out of, and relocating the most stable extents of data into, a first SSD, among the plurality of SSDs, that has reached a first wear-level threshold at a relocation rate calculated such that the first SSD is no longer a target of write IOs when the first SSD reaches a second wear-level threshold.

10. The method of claim 9 further comprising calculating the relocation rate by forecasting wear-level progression of the plurality of SSDs based on the monitored wear-level of the individual SSDs using an Auto Regressive Integrated Moving Average (ARIMA) forecasting algorithm and relocating the most stable extents of data into, and least stable extents of data out of, the first SSD at the calculated relocation rate.

11. The method of claim 10 further comprising identifying and selecting the most stable data on second SSDs, among the plurality of SSDs, that have not reached the first wear-level threshold.

12. The method of claim 11 further comprising identifying and selecting, for relocation into the first SSD, the most stable extents of data on the second SSDs based on a number of references to deduplicated extents and a number of references to deduplication hashes.

13. The method of claim 12 further comprising identifying and selecting the most stable extents of data on the second SSDs based on association with a snapshot.

14. The method of claim 13 further comprising relocating the least stable extents of data in SSDs, among the plurality of SSDs, that have reached the first wear-level threshold and have not reached the second wear-level threshold with the least stable extents of data from SSDs, among the SSDs, that have not reached the first wear-level threshold.

15. A non-transitory computer-readable storage medium storing instructions that when executed by a computer cause the computer to perform a method comprising:
monitoring wear-level of individual solid-state drives (SSDs) of a plurality of SSDs of an array configured to service host application IO commands to access host application data stored on the SSDs;
characterizing extents of data stored on each SSD of the plurality of SSDs in terms of stability from most stable to least stable based on data type and number of references to single instances of deduplicated data and hashes; and
relocating the least stable extents of data out of, and relocating the most stable extents of data into, a first SSD, among the plurality of SSDs, that has reached a first wear-level threshold at a relocation rate calculated such that the first SSD is no longer a target of write IOs when the first SSD reaches a second wear-level threshold.

16. The non-transitory computer-readable storage medium of claim 15 in which the method further comprises calculating the relocation rate by forecasting wear-level progression of the plurality of SSDs based on the monitored wear-level of the individual SSDs using an Auto Regressive Integrated Moving Average (ARIMA) forecasting algorithm and relocating the most stable extents of data into, and least stable extents of data out of, the first SSD at the calculated relocation rate.

17. The non-transitory computer-readable storage medium of claim 16 in which the method further comprises identifying and selecting, for relocation into the first SSD, the most stable extents of data on second SSDs, among the plurality of SSDs, that have not reached the first wear-level threshold.

18. The non-transitory computer-readable storage medium of claim 17 in which the method further comprises identifying and selecting the most stable extents of data on the second SSDs based on a number of references to deduplicated extents and a number of references to deduplication hashes.

19. The non-transitory computer-readable storage medium of claim 18 in which the method further comprises identifying and selecting the most stable extents of data on the second SSDs based on association with a snapshot.

20. The non-transitory computer-readable storage medium of claim 19 in which the method further comprises replacing the least stable extents of data in SSDs, among the plurality of SSDs, that have reached the first wear-level threshold and have not reached the second wear-level threshold with the most stable extents of data from SSDs, among the SSDs, that have not reached the first wear-level threshold.

* * * * *